United States Patent
Takada (10) Patent No.: US 8,714,953 B2
(45) Date of Patent: May 6, 2014

(54) METHOD OF MANUFACTURING MOLD FOR TIRE VULCANIZATION AND MOLD FOR TIRE VULCANIZATION

(75) Inventor: Noboru Takada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/009,636

(22) PCT Filed: Apr. 10, 2012

(86) PCT No.: PCT/JP2012/059797
§ 371 (c)(1),
(2), (4) Date: Oct. 3, 2013

(87) PCT Pub. No.: WO2012/141176
PCT Pub. Date: Oct. 18, 2012

(65) Prior Publication Data
US 2014/0023739 A1    Jan. 23, 2014

(30) Foreign Application Priority Data

Apr. 14, 2011 (JP) ................................. 2011-090160
Apr. 14, 2011 (JP) ................................. 2011-090162

(51) Int. Cl.
*B29C 33/10* (2006.01)
*B22D 19/00* (2006.01)

(52) U.S. Cl.
USPC .................. 425/28.1; 164/9; 164/10; 164/11; 164/106; 164/112; 425/812

(58) Field of Classification Search
USPC ............. 425/28.1, 35, 812; 164/9, 10, 11, 98, 164/106, 108, 112
See application file for complete search history.

(56) References Cited

U.S. PATENT DOCUMENTS

| 4,023,268 A * | 5/1977 | Momchilov ................. 425/28.1 |
| 5,866,171 A * | 2/1999 | Kata ............................ 425/28.1 |
| 7,384,252 B2 * | 6/2008 | Iwamoto et al. ............. 425/28.1 |
| 7,874,821 B2 | 1/2011 | Ohara |
| 8,568,120 B2 * | 10/2013 | Takada ......................... 425/28.1 |
| 2012/0148696 A1 | 6/2012 | Takada |

FOREIGN PATENT DOCUMENTS

| JP | 2006-334922 A | 12/2006 |
| JP | 2008-260135 A | 10/2008 |
| JP | 2011-046072 A | 3/2011 |
| JP | 2011-218590 A | 11/2011 |

* cited by examiner

Primary Examiner — James Mackey
(74) Attorney, Agent, or Firm — Carrier Blackman & Associates, P.C.; Joseph P. Carrier; Fulchand P. Shende (57) ABSTRACT

A vulcanizing mold manufacturing method, and a tire vulcanizing mold are disclosed. Tubular bodies each formed by oppositely arranging the inner peripheral surfaces of both end portions of a plate-shaped body are each arranged so that the gap between both opposite end portions thereof is narrowed and that the tips of both end portions come in contact with the surface of the plaster mold, by inserting and fitting both opposite end portions into a fitting portion of a plate-shaped metal fitting protruding from the surface of the plaster mold. Molten metal is poured over the surface of the plaster mold to embed the tubular body in a mold while exposing the tips of both opposite end portions at the tire molding surface of the mold. The metal fitting is removed from the mold, so that a mold having a small gap between both opposite end portions is manufactured.

11 Claims, 13 Drawing Sheets

METHOD OF MANUFACTURING MOLD FOR TIRE VULCANIZATION AND MOLD FOR TIRE VULCANIZATION

TECHNICAL FIELD

The present invention relates to a tire vulcanizing mold manufacturing method and a tire vulcanizing mold, and relates more specifically to a tire vulcanizing mold manufacturing method with which a mold having a small gap functioning as a vent mechanism by using a tubular body embedded in the mold can be manufactured with excellent production efficiency, and to a tire vulcanizing mold.

BACKGROUND ART

Tire vulcanizing molds are provided with vent mechanisms which discharge air left between a green tire and the mold and gas resulting from vulcanizing to the outside of the mold (see Patent Documents 1 and 2, for example). Patent Document 1 proposes a vent mechanism using a laminated blade which is a thin plate bent such that end portions on one side are superposed with each other while an end portion on the other side secures a large gap therein. This laminated blade is held by a block, and this block is fitted in a recessed pocket in the tire molding surface of the mold, thereby forming a vent chamber surrounded by the pocket and the block. Air and gas are discharged into the vent chamber through a small gap between the one end portions of the laminated blade and the large gap in the other end portion.

However, this vent mechanism requires: a step of forming the pocket in the tire molding surface of the mold after its casting; a step of making an assembly being the block holding the laminated blade; and a step of fitting this assembly into the pocket. Thus, the number of processing steps is increased, causing a problem of increased manufacturing time.

Patent Document 2 proposes a vent mechanism using a tubular body embedded in a mold at the time of casting it. A slit formed in the outer peripheral surface of the embedded tubular body is exposed at the tire molding surface of the mold, so that air and gas are discharged to the outside of the mold through this slit. According to this proposal, the processing steps can be reduced as compared to the proposal of Patent Document 1. However, to arrange the tubular body at a predetermined position on a plaster mold, the proposal of Patent Document 2 needs tubular body holding members arranged at both ends, in the tire circumferential direction, of each of pieces into which a sector is divided, and the like. Thus, there is a problem of complicating the operation of setting the tubular body on the plaster mold. Moreover, the mold needs to be cast through processes performed on a piece-by-piece basis, and hence there is a limit in improving the production efficiency.

PRIOR ART DOCUMENT

Patent Documents

Patent Document 1: Japanese patent application Kokai publication No. 2008-260135
Patent Document 2: Japanese patent application Kokai publication No. 2011-46072

SUMMARY OF THE INVENTION

Problem to be Solved by the Invention

An object of the present invention is to provide a tire vulcanizing mold manufacturing method with which a mold having a small gap functioning as a vent mechanism by using a tubular body embedded in the mold can be manufactured with excellent production efficiency, and to provide a tire vulcanizing mold.

Means for Solving the Problem

To achieve the above object, a tire vulcanizing mold manufacturing method of the present invention is a tire vulcanizing mold manufacturing method of manufacturing a mold to which a surface of a plaster mold is transferred by pouring molten metal over the surface of the plaster mold and solidifying the molten metal, characterized in that the method comprises the steps of: arranging a tubular body formed by oppositely arranging inner peripheral surfaces of both end portions of a plate-shaped body, in such a way that a gap between the both opposite end portions thereof is narrowed and that tips of the both end portions come in contact with the surface of the plaster mold, by inserting and fitting the both opposite end portions into a fitting portion of a plate-shaped metal fitting protruding from the surface of the plaster mold; pouring the molten metal over the surface of the plaster mold to embed the tubular body in a mold while exposing the tips of the both opposite end portions at a tire molding surface of the mold; and removing the metal fitting from the mold, so that a mold having a small gap between the both opposite end portions is manufactured.

Another tire vulcanizing mold manufacturing method of the present invention is a tire vulcanizing mold manufacturing method of manufacturing a mold to which a surface of a plaster mold is transferred by pouring molten metal over the surface of the plaster mold and solidifying the molten metal, characterized in that the method comprises the steps of: arranging a tubular body in such a way that both end portions thereof abutted to each other come in contact with the surface of the plaster mold, the tubular body being formed by abutting both end portions of a plate-shaped body to each other; and pouring the molten metal over the surface of the plaster mold to cast a mold in which the tubular body is embedded, the both abutted end portions are opened by use of heat of the casting to form a small gap therebetween, and the small gap is exposed at a tire molding surface of the mold.

A tire vulcanizing mold of the present invention is a tire vulcanizing mold formed by solidifying molten metal, characterized in that the mold comprises a tubular body embedded in the mold together with a plate-shaped metal fitting at the time of solidifying the molten metal, the tubular body is formed by oppositely arranging inner peripheral surface of both end portions of a plate-shaped body, a small gap is formed between the both opposite end portions and exposed at a tire molding surface of the mold, and the metal fitting is removed.

Another tire vulcanizing mold of the present invention is a tire vulcanizing mold cast by solidifying molten metal, characterized in that the mold comprises a tubular body embedded in the mold at the time of solidifying the molten metal, the tubular body is shaped by abutting both end portions of a plate-shaped body to each other, the both abutted end portions are opened by use of heat of the casting to form a small gap therebetween, and the small gap is exposed at a tire molding surface of the mold.

Effects of the Invention

According to the former tire vulcanizing mold manufacturing method of the present invention, the tubular body formed by oppositely arranging the inner peripheral surfaces of both end portions of a plate-shaped body is arranged in such a way that the gap between both opposite end portions thereof is narrowed and that the tips of both end portions come in contact with the surface of the plaster mold, by inserting and fitting both opposite end portions into the fitting portion of the plate-shaped metal fitting protruding from the surface of the plaster mold. In this way, the operation of setting the tubular body to the plaster mold can be done easily. Thus, the productivity can be improved accordingly. Moreover, the mold can be cast through processes performed not only in terms of the pieces but also in terms of the sectors. This point can also offer an advantage in improving the productivity.

With this manufacturing method, the former tire vulcanizing mold of the present invention can be obtained.

According to the latter tire vulcanizing mold manufacturing method of the present invention, the tubular body formed by abutting both end portions of a plate-shaped body to each other is arranged in such a way that both abutted end portions thereof come in contact with the surface of the plaster mold. Then, the molten metal is poured over the surface of the plaster mold to cast the mold in which the tubular body is embedded. Both abutted end portions are opened by use of heat of the casting to form the small gap therebetween, and the small gap is exposed at the tire molding surface of the mold. In this way, the small gap functioning as a vent mechanism can be formed along the casting of the mold. Accordingly, the small gap does not need to be formed in a separate step, and thus the mold can be manufactured with excellent production efficiency.

With this manufacturing method, the latter tire vulcanizing mold of the present invention can be obtained.

MODES FOR CARRYING OUT THE INVENTION

Hereinbelow, tire vulcanizing mold manufacturing methods and tire vulcanizing molds of the present invention will be described based on embodiments shown in the drawings. Arrows C, R, and W shown in drawings respectively indicate the circumferential direction, the radial direction, and the width direction of a green tire to be inserted and vulcanized in the vulcanizing molds.

Figure 1:
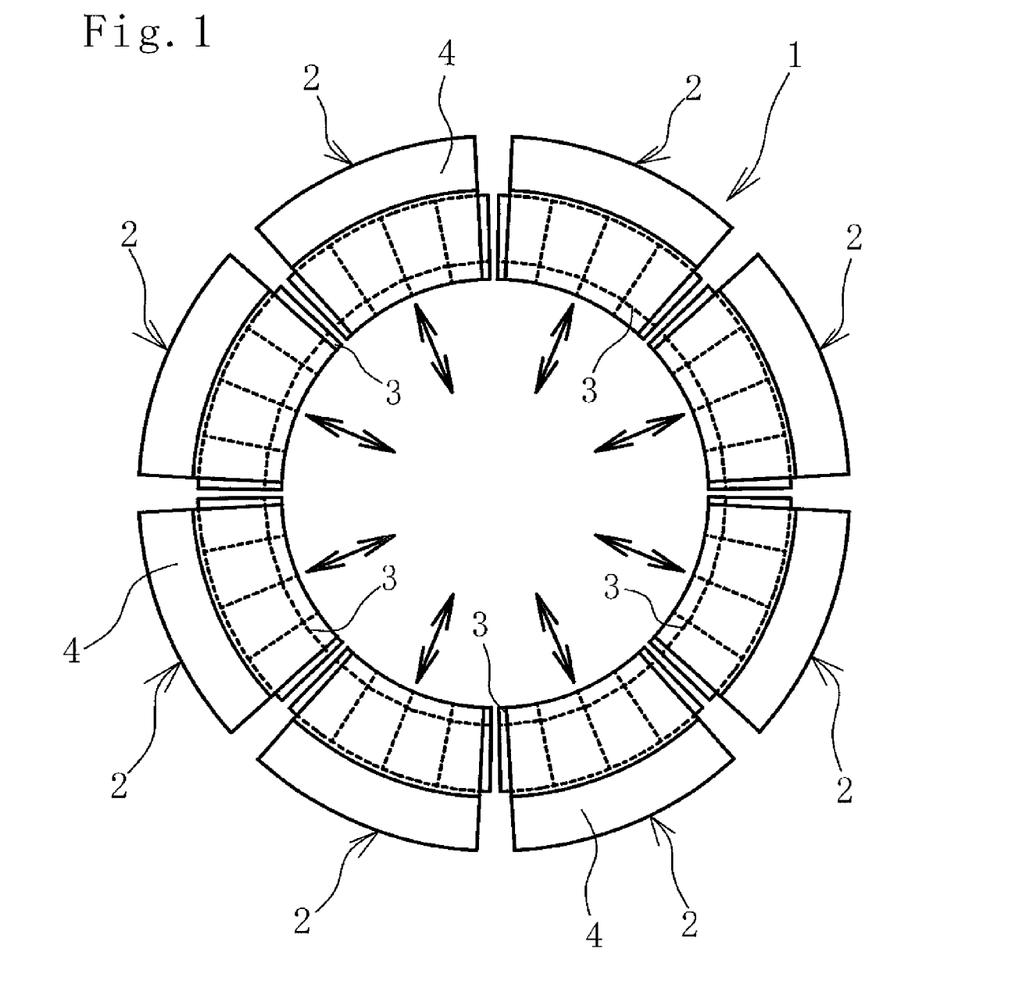
FIG. 1 is a plan view illustrating a tire vulcanizing mold of the present invention.
Figure 2:
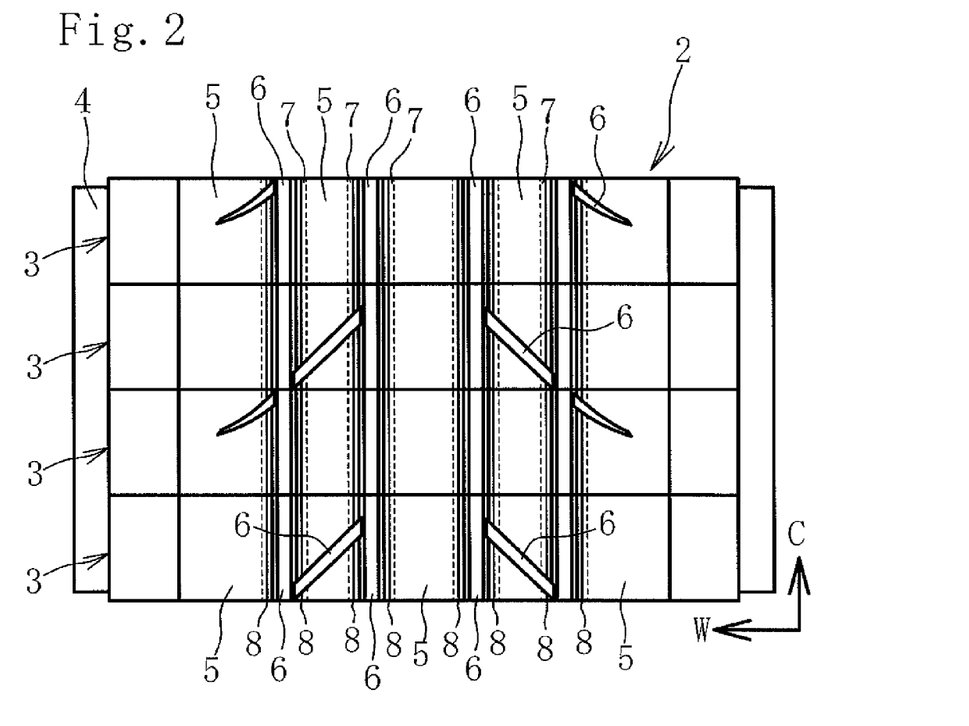
FIG. 2 is a plan view illustrating a sector in FIG. 1.
Figure 3:
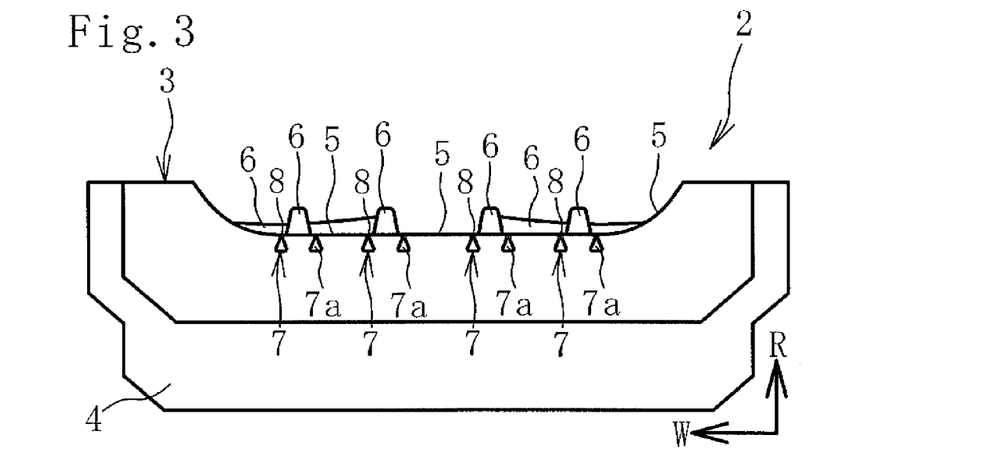
FIG. 3 is a front view of the sector in FIG. 2.

As illustrated in FIG. 1, a tire vulcanizing mold 1 (hereinafter, the mold 1) of the present invention is a sectional type formed of multiple sectors 2 assembled annularly. As illustrated in FIGS. 2 and 3, each sector 2 is formed of multiple pieces 3 and a back block 4, and each piece 3 is attached to the back block 4 while being in intimate contact with the adjacent piece(s) 3. The inner peripheral surfaces of the pieces 3 serve as a tire molding surface 5. Groove molding protrusions 6 for forming a tire's grooves are provided appropriately on the tire molding surface 5.

In this embodiment, four pieces 3 rectangular in a plan view are fixed to one sector 2. The number of pieces 3 provided to one sector 2 is not particularly limited, and their arrangement is not limited to this embodiment either.

Figure 4:
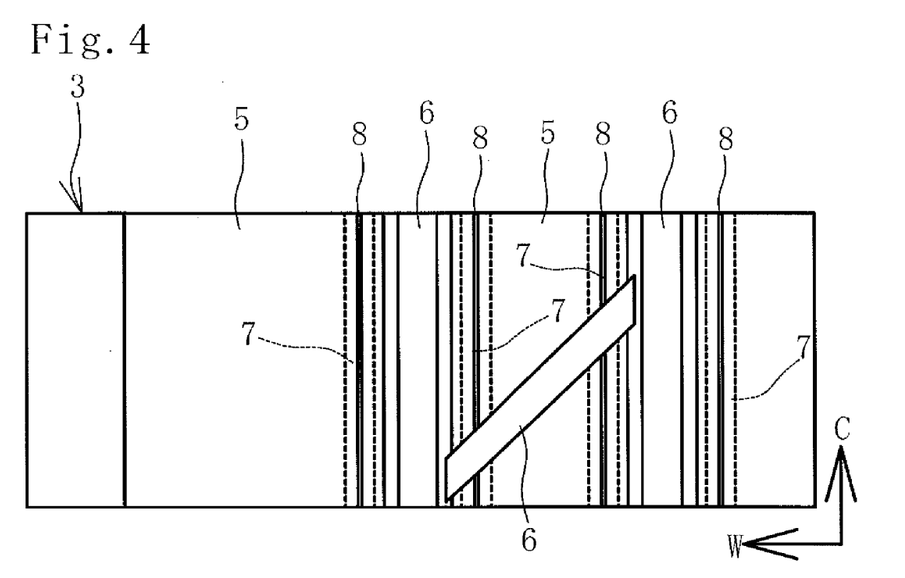
FIG. 4 is a plan view illustrating a left half of a piece in FIG. 3.
Figure 5:
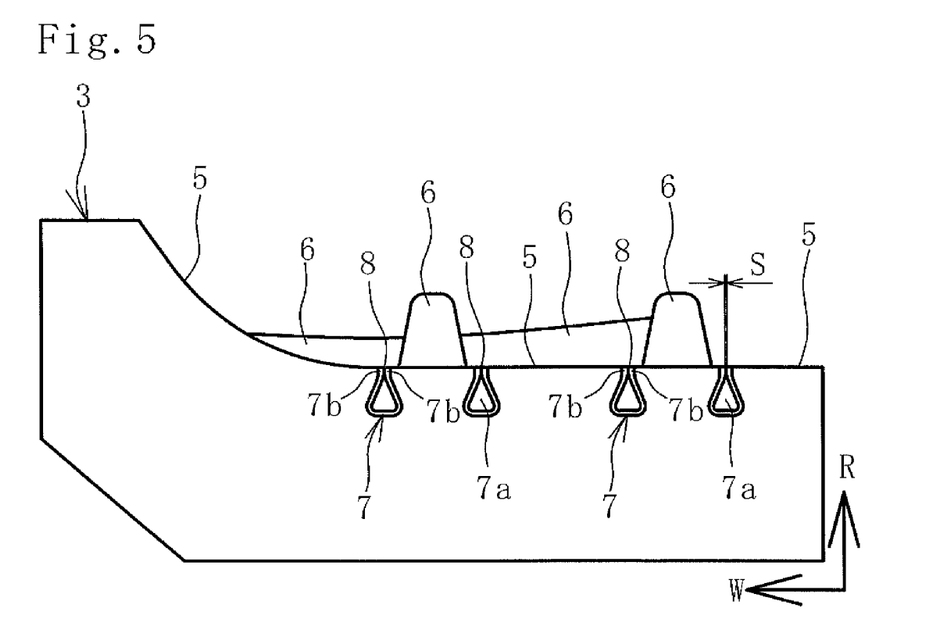
FIG. 5 is a front view of the piece in FIG. 4.

Each piece 3 is formed by solidifying molten metal M being a metal material such as aluminum or an aluminum alloy in a molten state. As illustrated in FIGS. 4 and 5, the piece 3 includes tubular bodies 7 which are embedded therein at the time of solidifying the molten metal M. Each tubular body 7 extends from one end surface to the other end surface of the piece 3, and both ends of the tubular body 7 are open at both end surfaces of the piece 3 in the tire circumferential direction.

This tubular body 7 is formed by oppositely arranging the inner peripheral surfaces of both end portions 7b of a plate-shaped body. A slit 8 having a small gap S is formed between both opposite end portions 7b. This slit 8 having the small gap S is exposed at the tire molding surface 5 of the piece 3.

For the tubular body 7, a metal material with a higher melting point than that of the molten metal M is used. For example, a tubular body 7 made of a steel such as stainless steel is used in the case where the molten metal M is aluminum.

Each tubular body 7 of this embodiment is such that the slit 8 communicates with a hollow inner portion 7a thereof having a triangular cross-sectional shape and that the hollow inner portion 7a communicates with the outside of the piece 3 through the slit 8. The slit 8 is formed in the outer peripheral surface of the tubular body 7 over the entire length of the tubular body 7 in its longitudinal direction (tire circumferential direction) and is exposed at the tire molding surface 5 of the piece 3. The small gap S of the slit 8 is about 0.01 mm to 0.10 mm and is preferably about 0.03 mm.

When a green tire is vulcanized, air and gas are discharged into each hollow inner portion 7a through the corresponding slit 8 and further discharged to the outside of the mold 1 through the end surfaces of each sector 2 and the like. The air and gas flowing past the slit 8 are discharged into the hollow inner portion 7a which is far larger than the slit 8. Thus, sufficient venting can be secured. Further, the hollow inner portions 7a of the adjacent tubular bodies 7 exposed at each end surface, in the tire circumferential direction, of the piece 3 may be connected by a vent groove which is separately formed in the end surface, in the tire circumferential direction, of the piece 3. In this way, the venting efficiency can be further improved.

Each slit 8 is provided in a location where air and gas are likely to pool when a green tire is vulcanized. For example, each tubular body 7 is embedded in the piece 3 (mold 1) such that its slit 8 is arranged in the vicinity of a root portion of a given groove molding protrusion 6.

The slits 8 only need to be in locations where venting is necessary. Thus, there may be a case where the tubular bodies 7 are embedded to provide the slits 8 to all the pieces 3 constituting the mold 1. Alternatively, there may be a case where the tubular bodies 7 are embedded to provide the slits 8 to a particular piece(s) 3.

Each tubular body 7 is not limited to a triangular tube shape; a circular tube shape, a tube shape with a rectangular cross section, and various tube shapes with other polygonal cross sections are available. The size of the hollow inner portion 7a of the tubular body 7 is, for example, about 0.5 mm to 5.0 mm in terms of its inner diameter.

A method of manufacturing the above piece 3 will be illustrated below.

Figure 6:
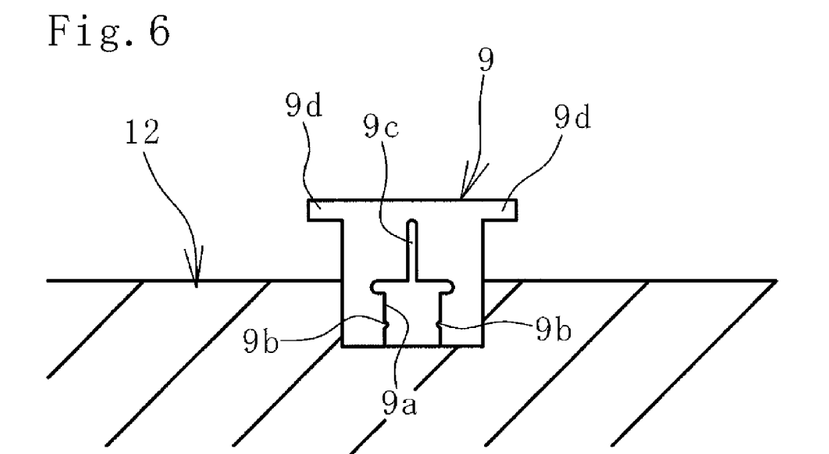
FIG. 6 is an enlarged cross-sectional view illustrating a rubber mold with metal fittings placed therein.
Figure 7:
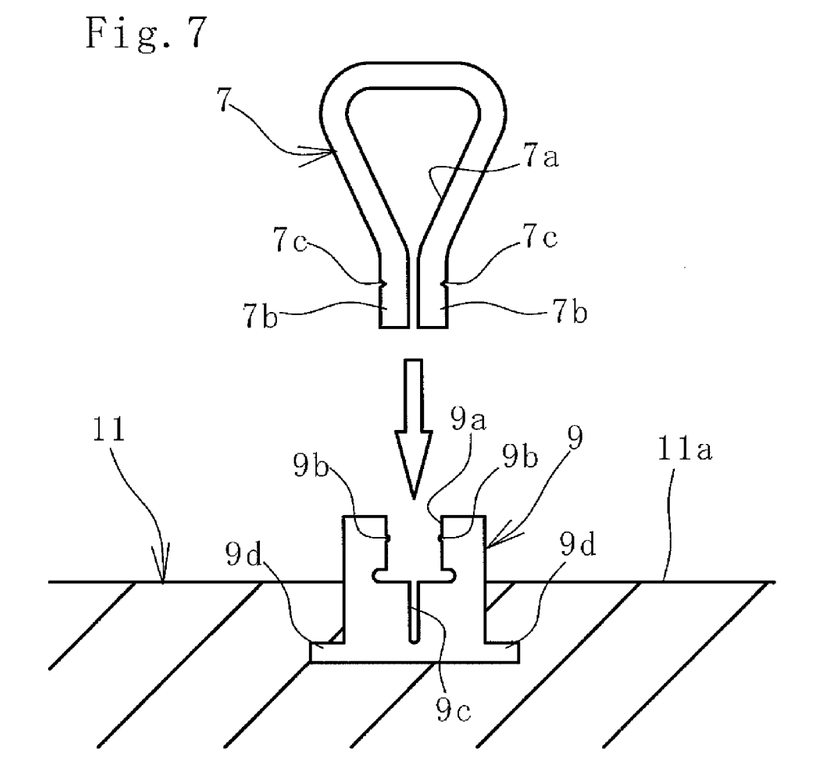
FIG. 7 is an enlarged cross-sectional view illustrating a step of attaching tubular bodies to a plaster mold with the metal fittings placed therein.

First, as illustrated in FIG. 6, plate-shaped metal fittings 9 are provided in such a way as to protrude from the surface of a rubber mold 12 to which the surface shape of a master mold has been transferred. Plaster is poured and solidified over the surface of the rubber mold 12 in this state, thereby manufacturing a plaster mold 11 to which the surface shape of the rubber mold 12 illustrated in FIG. 7 is transferred. The metal fittings 9 protrude from a surface 11a of this plaster mold 11.

Each metal fitting 9 is made, for example, of spring steel, and its thickness is about 0.2 mm to 0.6 mm and is preferably about 0.4 mm. A fitting portion 9a in which to fit the tubular body 7 is formed in the metal fitting 9. A cut portion 9c narrower than the fitting portion 9a is provided continuously from the lower end of the fitting portion 9a (the end in the direction in which the tubular body 7 is inserted).

Anchor portions 9d protruding in the width direction are provided to a lower end portion of each metal fitting 9. Each anchor portion 9d is configured to be anchored into the plaster mold 11. Thus, the metal fitting 9 is stably fixed to the plaster mold 11 with the help of the anchor portions 9d. It is possible to provide the metal fitting 9 with a through-hole instead, and to let the through-hole serve as the anchor portions 9d.

Moreover, engaging portions 9b protruding inward are provided to the fitting portion 9a. The engaging portions 9b are designed to be engaged with recessed engaging portions 7c formed in the outer sides of both opposite end portions 7b of the tubular body 7. Note that the engaging portions 9b may be recesses, and the engaging portions 7c may be protrusions.

Figure 8:
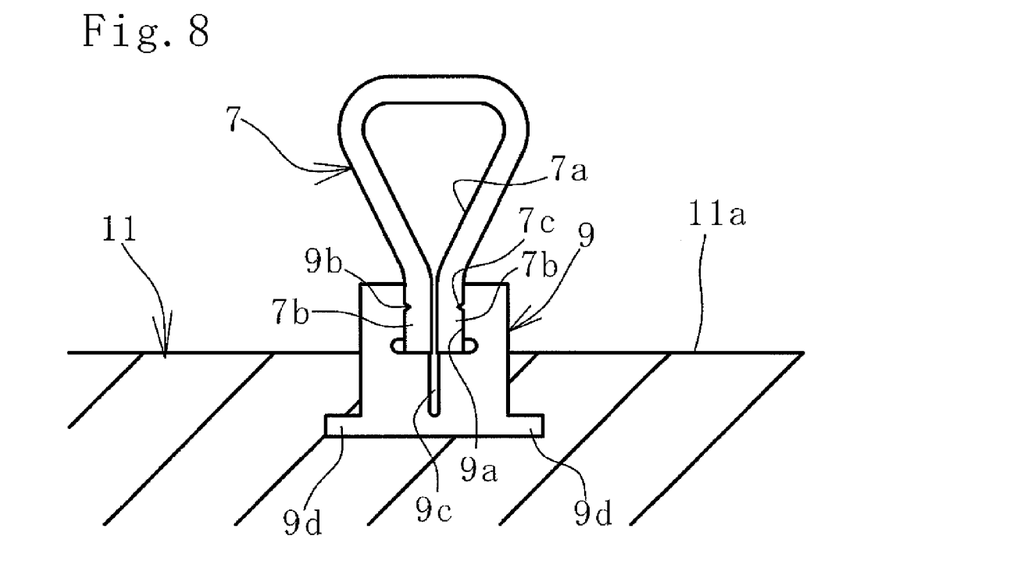
FIG. 8 is an enlarged cross-sectional view illustrating the plaster mold with the tubular bodies placed thereon through the metal fittings.

Thereafter, both opposite end portions 7b of each tubular body 7 are inserted and fitted into the fitting portion 9a of the corresponding metal fitting 9 protruding from the surface 11a of the plaster mold 11. As a result, the gap between both opposite end portions 7b is made narrower than that before the insertion, and the tips of both end portions 7b are arranged in contact with the surface of the plaster mold 11, as illustrated in FIG. 8.

In this state, the engaging portions 7c and the engaging portions 9b are engaged with each other, so that the tubular body 7 is positioned and set to the metal fitting 9 at a predetermined position as it is supposed to be. Both opposite end portions 7b of the tubular body 7 can be easily inserted into the fitting portion 9a because the metal fitting 9 is made of spring steel and the cut portion 9c is provided continuously from the lower end of the fitting portion 9a.

The surface 11a of the plaster mold 11 corresponds to the tire molding surface 5 of the piece 3, and recesses 11b in the surface 11a correspond to the groove molding protrusions 6 on the piece 3. The surface 11a of the plaster mold 11 is in an arc shape in the tire circumferential direction; thus, each tubular body 7 is preferably curved in an arc shape that follows the arc-shaped surface 11a of the plaster mold 11. It is possible to use a straight tubular body 7 in a case where the length of one plaster mold 11 in the tire circumferential direction is short and the surface 11a is substantially flat in the tire circumferential direction.

Figure 9:
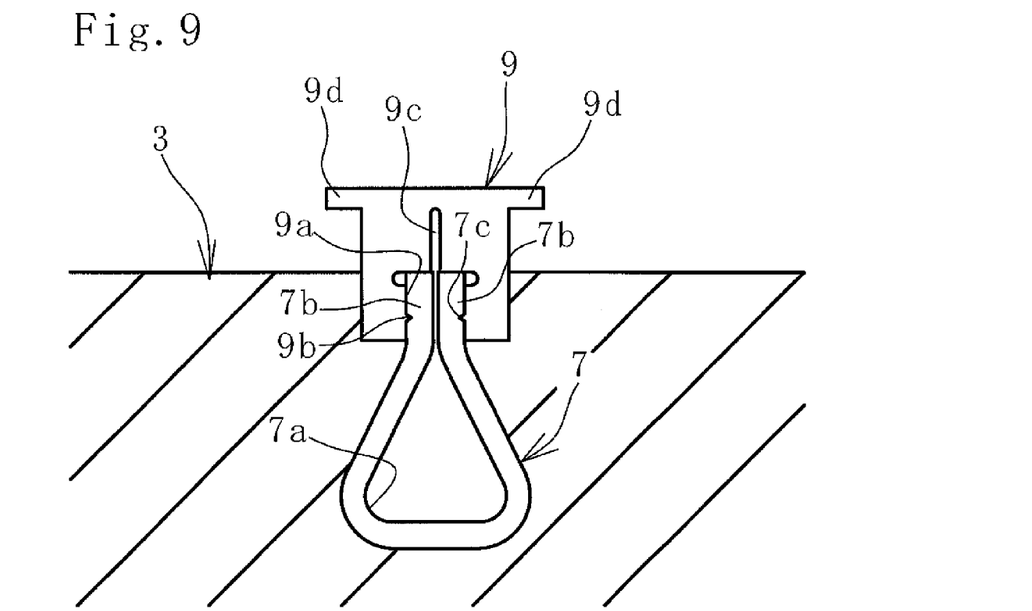
FIG. 9 is an enlarged cross-sectional view illustrating a mold after its casting.
Figure 10:
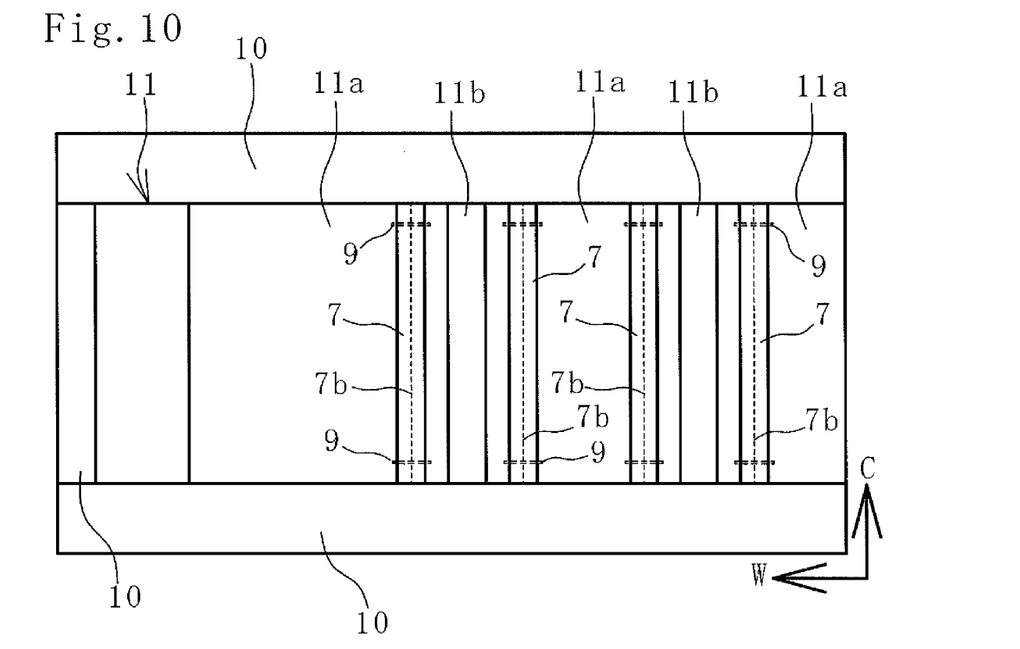
FIG. 10 is a plan view of a left half of the plaster mold illustrating a step of pouring molten metal over the surface of the plaster mold with the tubular bodies arranged thereon.
Figure 11:
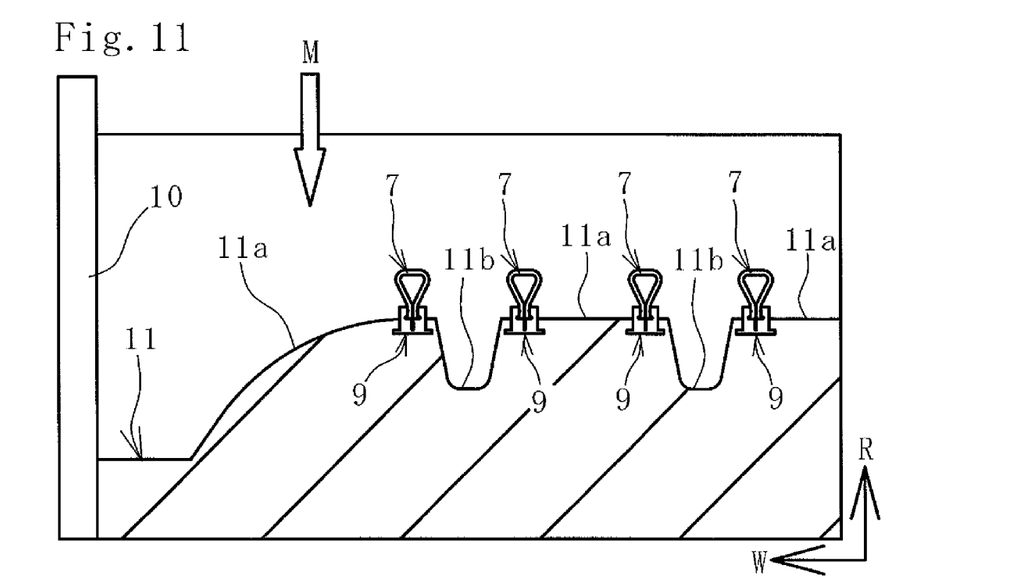
FIG. 11 is an explanatory view showing the step in FIG. 10 as seen from the front.

Thereafter, as illustrated in FIGS. 10 and 11, the four lateral sides of the plaster mold 11 are surrounded by frame members 10, and molten metal M is poured over the surface 11a of the plaster mold 11 in this state. As the molten metal M is solidified, a piece 3 is cast to which the surface 11a of the plaster mold 11 is transferred, as illustrated in FIG. 9.

Both opposite end portions 7b of each tubular body 7 have been arranged on the surface 11a of the plaster mold 11 in such a way that their tips come in contact with the surface of the plaster mold 11. Thus, the tubular body 7 is embedded in the piece 3 together with part of the metal fitting 9, and the tips (small gap S) of both end portions 7b are exposed at the tire molding surface 5 of the piece 3.

Thereafter, each metal fitting 9 is removed from the cast piece 3. A narrow hole created in the surface of the piece 3 as a result of removing the metal fitting 9 is filled with the same metal material as the piece 3 in a suitable manner. The metal fitting 9 can be easily pulled out of the cast piece 3 because the metal fitting 9 is made of spring steel and the cut portion 9c is provided continuously from the lower end of the fitting portion 9a.

Because the operation of setting each tubular body 7 to the plaster mold 11 can be done easily as described above, the operation time can be shortened, and thus the productivity can be improved.

Although the above embodiment has illustrated a case where each sector 2 is formed of multiple pieces 3, and casting is performed in terms of the pieces 3. However, the present invention is not limited to this case and is also applicable to a case where each sector 2 is not formed of multiple pieces 3. That is, the present invention is also applicable to a case where casting is performed in terms of the sectors 2.

Figure 12:
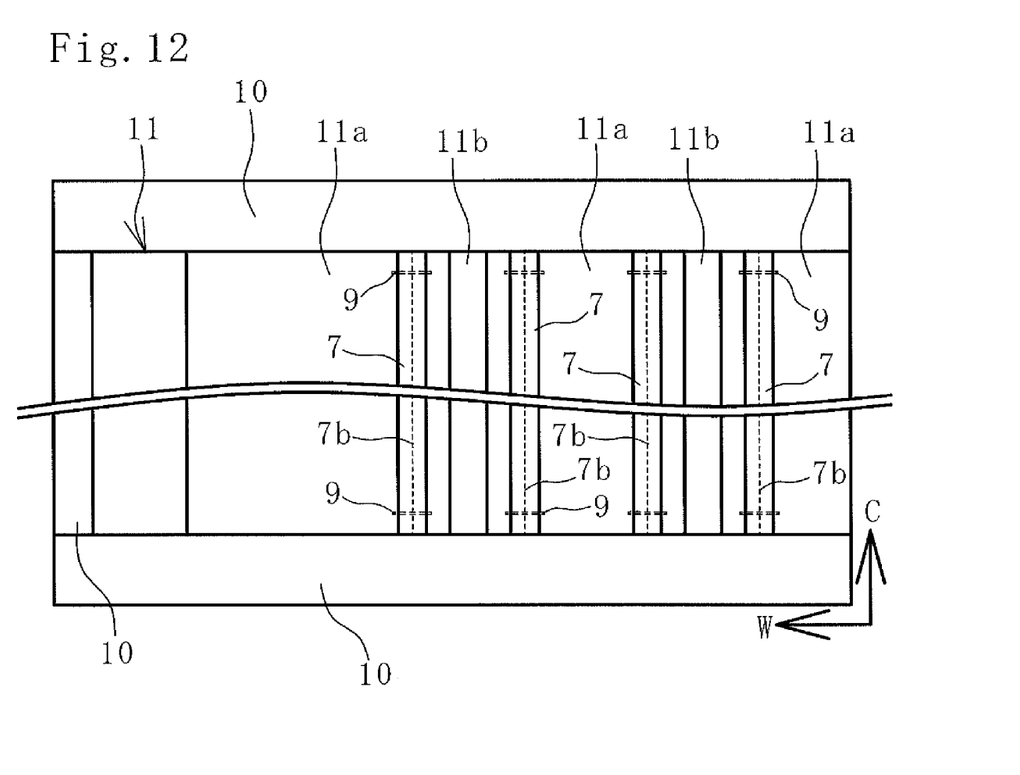
FIG. 12 is a plan view of a left half of a plaster mold illustrating a step of pouring molten metal over the surface of the plaster mold corresponding to a sector with the tubular bodies arranged thereon.
Figure 13:
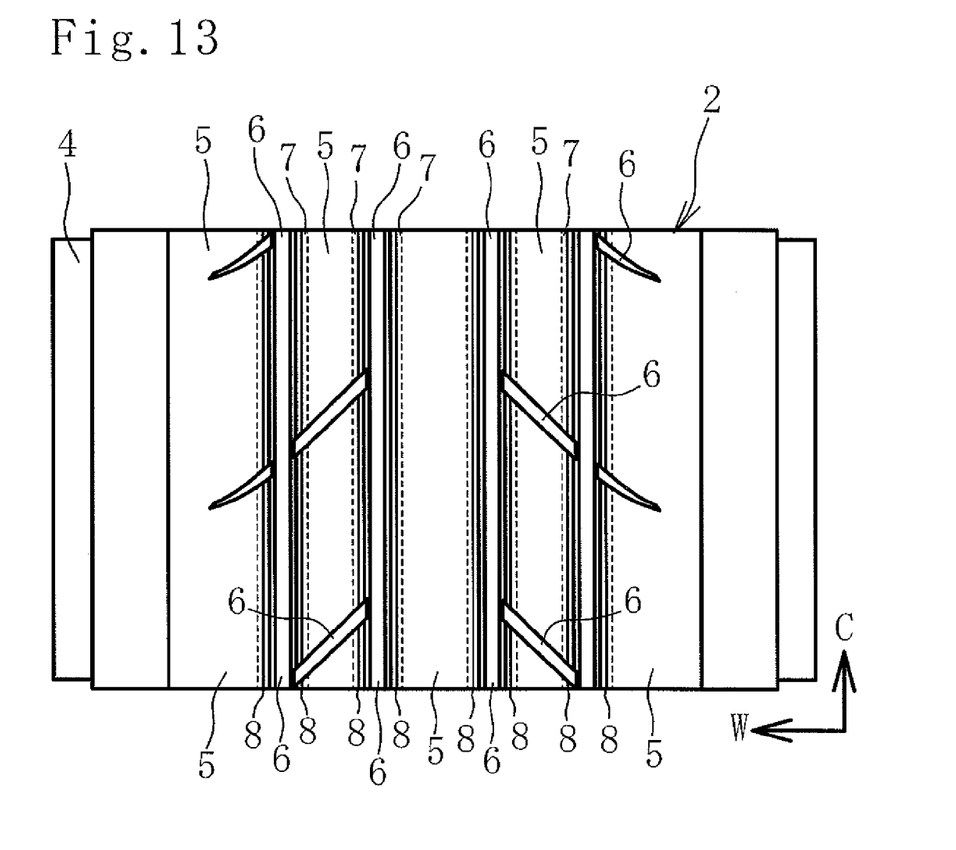
FIG. 13 is a plan view illustrating the sector cast by using the plaster mold in FIG. 12.

In this case, as illustrated in FIG. 12, the same procedure as the foregoing embodiment is taken; both opposite end portions 7b of each tubular body 7 are set in the corresponding metal fitting 9 to narrow the gap between both opposite end portions 7b and also to arrange the tips of both end portions 7b in contact with the surface of a plaster mold 11 which corresponds to the sector 2. Thereafter, casting is performed by following the same procedure as the foregoing embodiment to manufacture the sector 2 as illustrated in FIG. 13. In this way, casting can be done in terms of the sectors 2, instead of the pieces 3 into which each sector 2 is divided. This is more advantageous in improving the productivity.

Next, another tire vulcanizing mold manufacturing method and another tire vulcanizing mold of the present invention will be described based on an embodiment shown in drawings.

As illustrated in FIG. 1, this mold 1 is a sectional type formed of multiple sectors 2 assembled annularly, as in the foregoing embodiment. As illustrated in FIGS. 2 and 3, each sector 2 is formed of multiple pieces 3 and a back block 4, and each piece 3 is attached to the back block 4 while being in intimate contact with the adjacent piece(s) 3. The inner peripheral surfaces of the pieces 3 serve as a tire molding surface 5. Groove molding protrusions 6 for forming a tire's grooves are provided appropriately on the tire molding surface 5.

The number of pieces 3 provided to one sector 2 only needs to be plural, and their arrangement is not limited to this embodiment either.

Each piece 3 is formed by solidifying molten metal M being a metal material such as aluminum or an aluminum alloy in a molten state. As illustrated in FIGS. 4 and 5, the piece 3 includes tubular bodies 7 which are embedded therein at the time of solidifying the molten metal M. Each tubular body 7 extends from one end surface to the other end surface of the piece 3, and both ends of the tubular body 7 in its longitudinal direction are open at both end surfaces of the piece 3 in the tire circumferential direction.

As will be described later, this tubular body 7 is shaped by abutting both end portions of a plate-shaped body 14 to each other. Both abutted end portions 7b are opened by heat of casting, thereby forming a slit 8 having a small gap S. This slit 8 having the small gap S is exposed at the tire molding surface 5 of the piece 3.

For the tubular body 7, a metal material with a higher melting point than that of the molten metal M is used. For example, a tubular body 7 made of a steel such as stainless steel is used in the case where the molten metal M is aluminum.

Each tubular body 7 of this embodiment is such that the slit 8 communicates with a hollow inner portion 7a thereof having a triangular cross-sectional shape and that the hollow inner portion 7a communicates with the outside of the piece 3 through the slit 8. The slit 8 is formed in the outer peripheral surface of the tubular body 7 over the entire length of the tubular body 7 in its longitudinal direction (tire circumferential direction) and is exposed at the tire molding surface 5 of the piece 3. The small gap S of the slit 8 is about 0.01 mm to 0.10 mm and is preferably about 0.03 mm.

When a green tire is vulcanized, air and gas are discharged into each hollow inner portion 7a through the corresponding slit 8 and further discharged to the outside of the mold 1 through the end surfaces of each sector 2 and the like. The length of the slit 8 in the tire radial direction is about 1 mm to 5 mm and is preferably about 2 mm. The air and gas flowing past the slit 8 are discharged into the hollow inner portion 7a which is far larger than the slit 8. Thus, sufficient venting can be secured. Further, the hollow inner portions 7a of the adjacent tubular bodies 7 exposed at each end surface, in the tire circumferential direction, of the piece 3 may be connected by a vent groove which is separately formed in the end surface, in the tire circumferential direction, of the piece 3. In this way, the venting efficiency can be further improved.

Each slit 8 is provided in a location where air and gas are likely to pool when a green tire is vulcanized. For example, each tubular body 7 is embedded in the piece 3 (mold 1) such that its slit 8 is arranged in the vicinity of a root portion of a given groove molding protrusion 6. The slits 8 only need to be in locations where venting is necessary. Thus, there may be a case where the tubular bodies 7 are embedded to provide the slits 8 to all the pieces 3 constituting the mold 1. Alternatively, there may be a case where the tubular bodies 7 are embedded to provide the slits 8 to a particular piece(s) 3.

Each tubular body 7 is not limited to a triangular tube shape; a circular tube shape, a tube shape with a rectangular cross section, and various tube shapes with other polygonal cross sections are available. The size of the hollow inner portion 7a of the tubular body 7 is, for example, about 0.5 mm to 5.0 mm in terms of its inner diameter.

A method of manufacturing the above piece 3 will be illustrated below.

Figure 14:
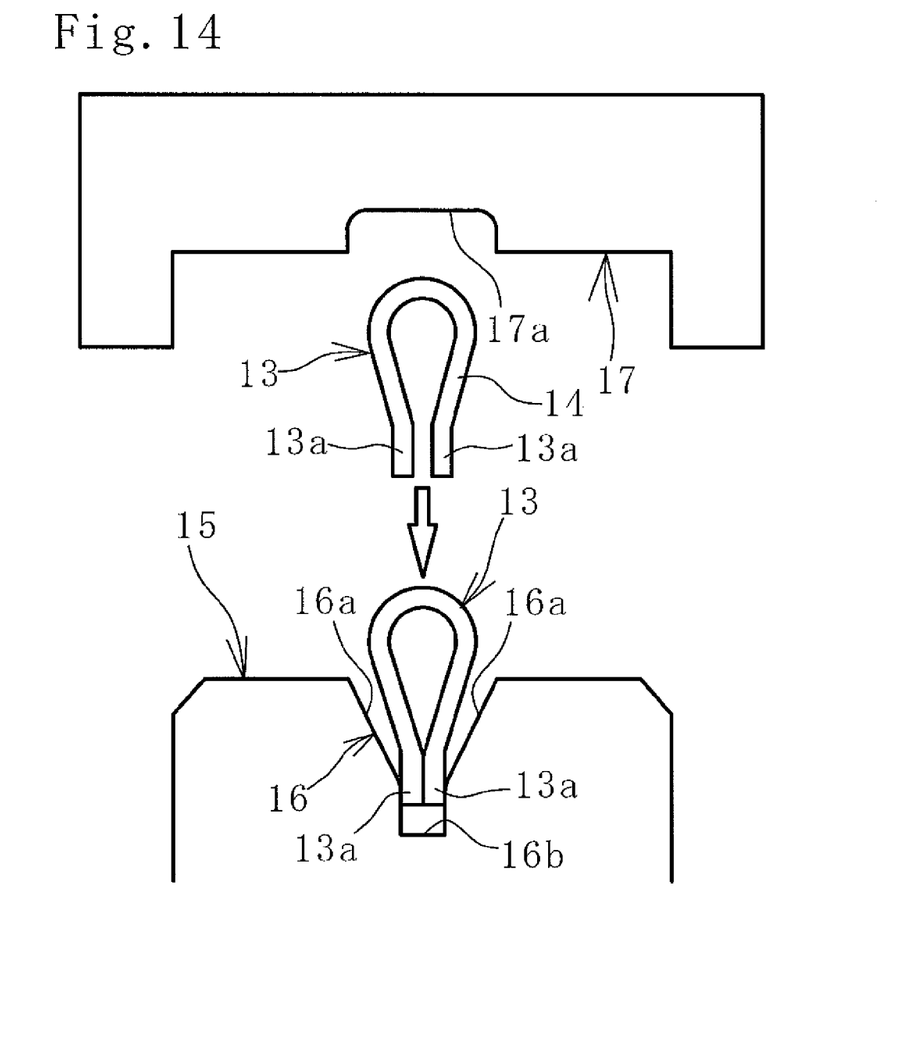
FIG. 14 is an explanatory view illustrating a step of forming each tubular body from an intermediate tubular body.

First, to manufacture each tubular body 7, a press or the like is used to bend the plate-shaped body 14 as illustrated in FIG. 14 to thereby form an intermediate tubular body 13 with the inner peripheral surfaces of both end portions 13a being opposite to each other. Then, a receiving jig 15 and a pressing tool 17 are used to shape the intermediate tubular body 13 into the tubular body 7.

The receiving jig 15 has a receiving groove 16, and the receiving groove 16 is formed of: a pair of left and right inclined surfaces 16a with a gap therebetween which becomes narrower from an upper side to a lower side; and a receiving groove 16b provided continuously from the lower end of each inclined surface 16a. The pressing tool 17 is arranged above the receiving jig 15 and configured to move up and down. A pressing grove 17a is formed in the lower surface of the pressing tool 17.

Both opposite end portions 13a of the intermediate tubular body 13 are fitted into the receiving groove 16 of the receiving jig 15 to set the intermediate tubular body 13 to the receiving jig 15. As a result, the outer peripheral surfaces of both opposite end portions 13a of the intermediate tubular body 13 are restrained in the receiving groove 16.

Figure 15:
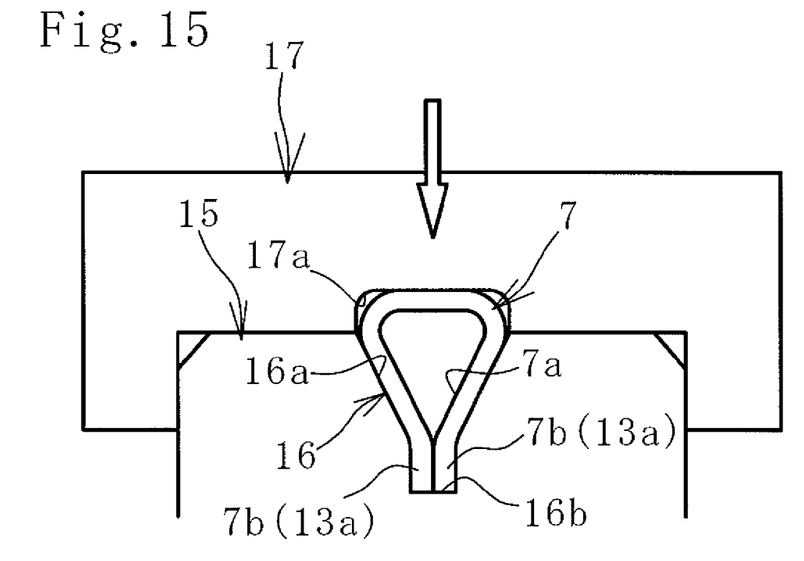
FIG. 15 is an explanatory view illustrating the tubular body thus formed.

Thereafter, as illustrated in FIG. 15, the pressing tool 17 is caused to move down from this state, so that its pressing groove 17a presses a head portion of the intermediate tubular body 13 and thus presses the intermediate tubular body 13 toward the tips (lower ends) of both opposite end portions 13a thereof, thereby compressing the tips (lower ends).

By this pressing, both opposite end portions 13a are restrained in the receiving groove 16 and deformed to be abutted to each other with no gap therebetween. Moreover, the head portion of the intermediate tubular body 13 is deformed into the hollow inner portion 7a with the triangular cross-sectional shape. As a result, the intermediate tubular body 13 is processed into the tubular body 7.

Figure 16:
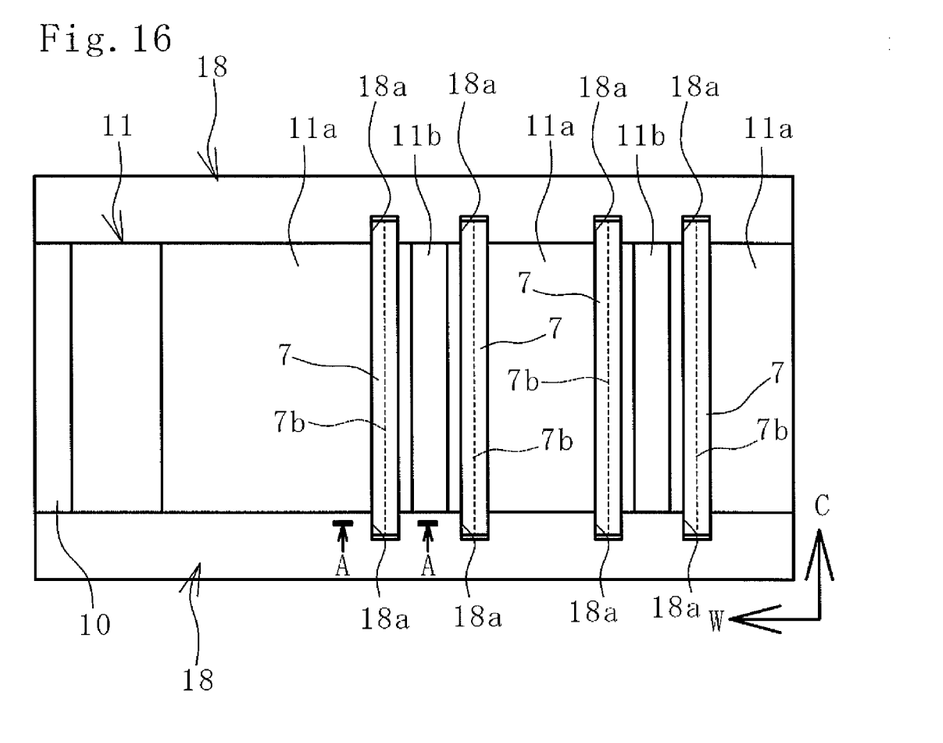
FIG. 16 is a plan view of the left half of the plaster mold illustrating a step of pouring molten metal over the surface of the plaster mold with the tubular bodies arranged thereon.
Figure 17:
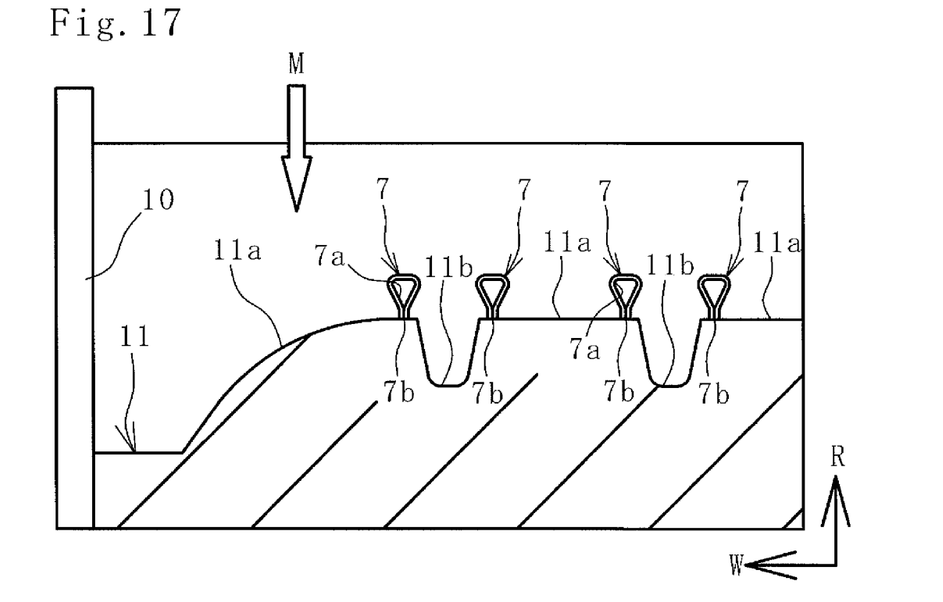
FIG. 17 is an explanatory view showing the step in FIG. 16 as seen from the front.

As illustrated in FIGS. 16 and 17, each tubular body 7 thus manufactured is arranged such that both abutted end portions 7b thereof come in contact with the surface 11a of the plaster mold 11. The surface 11a of the plaster mold 11 corresponds to the tire molding surface 5 of the piece 3, and recesses 11b in the surface 11a correspond to the groove molding protrusions 6 on the piece 3. The surface 11a of the plaster mold 11 is in an arc shape in the tire circumferential direction; thus, each tubular body 7 is preferably curved in an arc shape that follows the arc-shaped surface 11a of the plaster mold 11. It is possible to use a straight tubular body 7 in a case where the length of one plaster mold 11 in the tire circumferential direction is short and the surface 11a is substantially flat in the tire circumferential direction.

In this embodiment, tubular body holding members 18 each having holding grooves 18a are arranged at both ends, in the tire circumferential direction, of the plaster mold 11. Frame members 10 are arranged at both ends, in the tire width direction, of the plaster mold 11. Thus, the four lateral sides of the plaster mold 11 are surrounded by the tubular body holding members 18 and the frame members 10.

Figure 18:
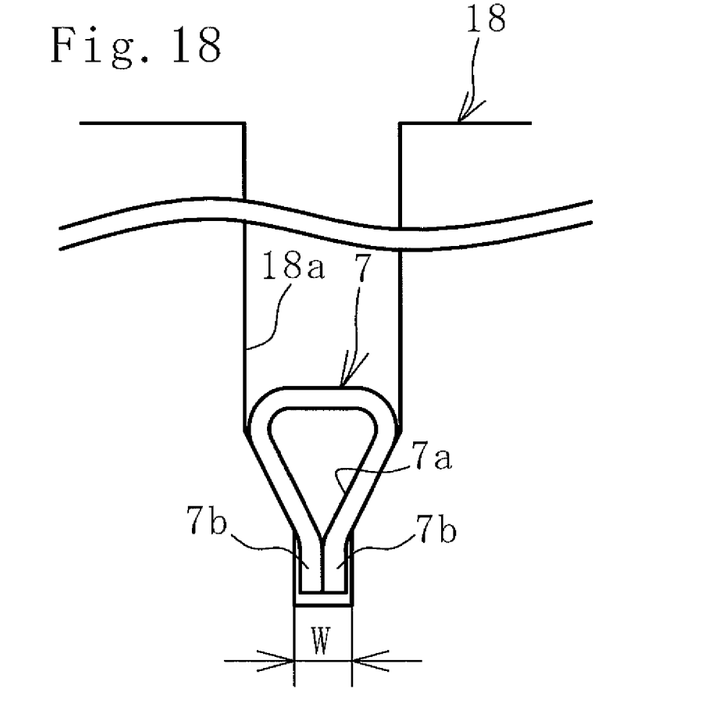
FIG. 18 is a cross-sectional view taken along line A-A in FIG. 16.

Moreover, as illustrated in FIG. 18, both end portions of each tubular body 7 in its longitudinal direction are fitted into the holding grooves 18a without both abutted end portions 7b thereof being restrained. As a result, the tubular body 7 is arranged such that both abutted end portions 7b come in contact with the surface 11a of the plaster mold 11. By using the tubular body holding members 18 as above, the tubular body 7 can be arranged at a predetermined position on the plaster mold 11 accurately and stably.

Thereafter, in this state, the molten metal M is poured over the surface 11a of the plaster mold 11, and the molten metal M is solidified, thereby casting the piece 3 to which the surface 11a of the plaster mold 11 is transferred. In the case where the molten metal M is aluminum, its temperature is about 550° C. to 780° C. Heat of the casting opens both abutted end portions 7b of the tubular body 7, thus forming the slit 8 having the small gap S.

Specifically, both abutted end portions 7b of each tubular body 7 have been deformed to be forcibly in contact with each other. When the tubular body 7 in this state is heated by the molten metal M, the tubular body 7 undergoes thermal expansion, thereby relaxing the stress that is forcing both abutted end portions 7b to be in contact with each other. As a result, both abutted end portions 7b are deformed to be separated away from each other, thereby forming the slit 8 having the small gap S.

Because the tubular body 7 is arranged such that both abutted end portions 7b thereof come in contact with the surface 11a of the plaster mold 11, the tubular body 7 is embedded in the piece 3, and also the slit 8 is exposed at the tire molding surface 5 of the piece 3. Both end portions of the tubular body 7 in its longitudinal direction that are protruding from the piece 3 are cut off.

As described above, the slit 8 having the small gap S functioning as a vent mechanism can be formed in the casting step of pouring and solidifying the molten metal M over the surface 11a of the plaster mold 11. Accordingly, the small gap S does not need to be formed in a separate step, and thus the man-hour for the processing can be reduced as compared to conventional cases.

Moreover, in this embodiment, both end portions of the tubular body 7 in its longitudinal direction are fitted into the holding grooves 18a of the tubular body holding members 18 without both abutted end portions 7b being restrained. This prevents a situation where it is difficult to open both abutted end portions 7b at the time of casting. The opened state of both abutted end portions 7b can be adjusted by adjusting a width W of a portion of the holding groove 18a corresponding to both abutted end portions 7b. In this way, the small gap S can be adjusted. Specifically, the portion of the holding groove 18a corresponding to both abutted end portions 7b can suppress opening movement of both abutted end portions 7b within a certain range. Accordingly, it is possible to prevent both abutted end portions 7b from opening excessively.

EXPLANATION OF REFERENCE NUMERALS 1 mold
2 sector
3 piece
4 back block
5 tire molding surface
6 groove molding protrusion
7 tubular body
7a hollow inner portion
7b both end portions
7c engaging portion
7d both end portions
8 slit
9 metal fitting
9a fitting portion
9b engaging portion
9c cut portion
9d anchor portion
10 frame member
11 plaster mold
11a surface
11b recess in surface
12 rubber mold
13 intermediate tubular body
13a hollow inner portion
13b both end portions
14 plate-shaped body
15 receiving jig
16 receiving groove
16a inclined surface
16b receiving groove
17 pressing tool
17a pressing groove
18 tubular body holding member
18a holding groove
M molten metal

The invention claimed is:

1. A tire vulcanizing mold manufacturing method of manufacturing a mold to which a surface of a plaster mold is transferred by pouring molten metal over the surface of the plaster mold and solidifying the molten metal, characterized in that the method comprises the steps of:
    arranging a tubular body formed by oppositely arranging inner peripheral surfaces of both end portions of a plate-shaped body, in such a way that a gap between the both opposite end portions thereof is narrowed and that tips of the both end portions come in contact with the surface of the plaster mold, by inserting and fitting the both opposite end portions into a fitting portion of a plate-shaped metal fitting protruding from the surface of the plaster mold;
    pouring the molten metal over the surface of the plaster mold to embed the tubular body in a mold while exposing the tips of the both opposite end portions at a tire molding surface of the mold; and
    removing the metal fitting from the mold, so that a mold having a small gap between the both opposite end portions is manufactured.

2. The tire vulcanizing mold manufacturing method according to claim 1, wherein the tubular body is positioned by engaging an engaging portion provided to the fitting portion of the metal fitting with engaging portions provided to outer peripheral surfaces of the both opposite end portions of the tubular body when the both opposite end portions are inserted into the fitting portion.

3. The tire vulcanizing mold manufacturing method according to claim 1, wherein
    the metal fitting is made of spring steel, and
    a cut portion is provided continuously from a lower end of the fitting portion.

4. The tire vulcanizing mold manufacturing method according to claim 1, wherein the metal fitting has an anchor portion to be anchored in the plaster mold.

5. The tire vulcanizing mold manufacturing method according to claim 2, wherein
    the metal fitting is made of spring steel, and
    a cut portion is provided continuously from a lower end of the fitting portion.

6. The tire vulcanizing mold manufacturing method according to claim 2, wherein the metal fitting has an anchor portion to be anchored in the plaster mold.

7. A tire vulcanizing mold manufacturing method of manufacturing a mold to which a surface of a plaster mold is transferred by pouring molten metal over the surface of the plaster mold and solidifying the molten metal, characterized in that
    the method comprises the steps of:

arranging a tubular body, formed by abutting both end portions of a plate-shaped body to each other, in such a way that the both end portions thereof abutted to each other come in contact with the surface of the plaster mold, pouring the molten metal over the surface of the plaster mold to cast a mold in which the tubular body is embedded, the both abutted end portions are opened by use of heat of the casting to form a small gap therebetween, and the small gap is exposed at a tire molding surface of the mold.

8. The tire vulcanizing mold manufacturing method according to claim 7, wherein an intermediate tubular body is formed by oppositely arranging inner peripheral surfaces of the both end portions of the plate-shaped body, and the tubular body is formed by pressing the intermediate tubular body toward tips of the both opposite end portions thereof while restraining outer peripheral surfaces of the both end portions to compress the tips.

9. The tire vulcanizing mold manufacturing method according to claim 7, wherein tubular body holding members having grooves are arranged at both ends of the plaster mold, and the tubular body is arranged in such a way that the both abutted end portions of the tubular body come in contact with the surface of the plaster mold, by fitting the tubular body into the grooves without the both abutted end portions thereof being restrained.

10. The tire vulcanizing mold manufacturing method according to claim 8, wherein tubular body holding members having grooves are arranged at both ends of the plaster mold, and the tubular body is arranged in such a way that the both abutted end portions of the tubular body come in contact with the surface of the plaster mold, by fitting the tubular body into the grooves without the both abutted end portions thereof being restrained.

11. A tire vulcanizing mold formed by solidifying molten metal, characterized in that the mold comprises a tubular body embedded in the mold together with a plate-shaped metal fitting at the time of solidifying the molten metal, the tubular body is formed by oppositely arranging inner peripheral surfaces of both end portions of a plate-shaped body, a small gap is formed between the both opposite end portions and exposed at a tire molding surface of the mold, and the metal fitting is removed.

* * * * *